INVENTOR.
JOHN A. ROBERTS

June 1, 1965  J. A. ROBERTS  3,186,214
LEAK TEST STATION
Filed July 29, 1963  2 Sheets-Sheet 2

INVENTOR.
JOHN A. ROBERTS
BY
HIS ATTORNEY

United States Patent Office 3,186,214
Patented June 1, 1965

3,186,214
LEAK TEST STATION
John A. Roberts, Lynnfield Center, Mass., assignor to General Electric Company, a corporation of New York
Filed July 29, 1963, Ser. No. 298,118
15 Claims. (Cl. 73—40.7)

This invention relates to leak detectors and more particularly to their usage in automatically performing leakage tests upon units which are sequentially presented at a test station.

The automation of production lines which produce equipment requiring leak testing at any stage in the production sequency has made it highly desirable, or in some cases actually essential, to attempt to integrate the leak testing function into the over-all production operation.

These requirements have brought to light the deficiencies of the prior art leak test stations. Broadly speaking, these deficiencies relate to the difficulties encountered in connecting various functions to the test enclosure while at the same time keeping the various interconnecting lines free from accumulations of the tracer gas utilized. This is highly desirable since the presence of such accumulations requires that the timing of each particular function being performed during the leak test operation be lengthened so as to take into account the length of time necessary for the system to pump out such accumulations. This makes the response time of the leak test station considerably slower, thus limiting the rate at which leak tests can be performed. This correspondingly limits the rate at which the integrated production line can function, or at least limits the rate of testing where integration into the production line is not possible. Furthermore, extremely troublesome false leak signals occur until such accumulations are pumped out.

It has also been found that another limiting factor with respect to the response time of a leak test station relates to the functions performed when the test station is calibrated to set its upper or reject leak limit. This calibration procedure requires that a leak of a desired size be introduced into the container from a leak standard. This calibration operation, which is preferably immediately initiated in response to a signal, thus requires the immediate availability of a leak of the desired size. Furthermore, this leak must be mixed with purified air and transported into the test enclosure container.

The selective pressurization of a leak standard, which has been heretofore used, in order to selectively render available a leak of known size has been found to be unacceptable since the response time of the normal leak standard varies from fifteen seconds for large leaks to as long as two minutes in the case of small leaks.

These prior art problems are thus related to the response time of the unit which limits the rate at which leak tests may be made. It is therefore an object of this invention to provide a leak test station having improved response time.

It is a further object of this invention to improve the response time of a leak test station by preventing the accumulation of tracer gas within connections to the test station enclosure.

It is still another object of this invention to improve the response time of a leak test station by decreasing the time necessary to introduce leaks for calibration purposes into the test enclosure from a leak standard.

Another response-time limiting factor relates to the accuracy with which the leak tests can be made on the items cyclically presented at the test station.

Broadly speaking, the accuracy of leak measurements is not limited by the availability of sensitive detectors, but is limited by the ability to maintain the desired tracer-gas-free environment in the test enclosure. This ability to obtain such an environment is generally limited by the magnitude of tracer gas leakage into the test enclosure from the connectors utilized for establishing connections to the test unit. Another source of leakage relates to the seals between the removable portion of the test enclosure and the fixed portion thereof.

It has been found that when utilizing highly sensitive leak detectors capable of measuring tracer gases in the order of one part in a billion, even the best easily-releasable connectors have a significant leakage in this range of operation. Of course, the use of more permanent connections within the test enclosure would materially help to eliminate this source of leakage. However, this would seriously affect the ease and rapidity with which connections may be established to the unit under test.

It is therefore an object of my invention to improve the connections to test units so as to reduce the leakage into a test enclosure while still utilizing quick release connectors.

Heretofore, it has been a common practice to utilize gasket-type seals between the removable and stationary portions of the test enclosure in order to prevent leakage into the test enclosure. This technique is acceptable when testing units for relatively large leaks, but is completely unacceptable when testing for leaks of the order of $10^{-6}$ ccs./sec. Acceptable accuracy is not possible with gasket seals since the types of rubber or plastic normally utilized will pick up halogen tracer gases and release them into the interior of the container. In such cases, the leak measurements made are worthless due to the entry into the test enclosure of an unknown quantity of tracer gas which is released by the seals. This tracer gas will enter the test enclosure even when a differential pressure exists which would tend to prevent the entry of tracer gases emanating from sources external to the seals. Thus, it has been found that the flow out through the seals due to the slight differential pressure is not effective to prevent the entry of tracer gases emanating from the seals.

It is therefore an object of this invention to provide improved seals between the fixed and movable portions of the test enclosure to prevent the introduction of tracer gases into the test enclosure.

In accordance with the invention, accumulations in unused connecting lines are eliminated by utilizing the source of purified air normally required in such test stations to flush the unused lines with purified air. This is accomplished by interconnecting the inlet to the test enclosure, the external element to which it is to be selectively connected and the source of purified air in a T-shaped connecton. The switching function associated with utilizing the T-shaped configuration makes use of two-way and three-way valves which are located in the arms of the T remote from the inlet to test enclosure. The function to be connected to the inlet of the test enclosure via one of the arms of the T is positioned with respect to the three-way valve so that any accumulations of tracer gas in the lines will either be carried into the test enclosure from which it may be purged or directly exhausted to the atmosphere.

It is another feature of the invention to provide for the sweeping of any normally closed valve seat by a continuous flow of purified air to prevent the occurrence of any pocket at the valve seat or in the line connected to the normally closed valve seat.

This principle of continuously flushing unused lines also facilitates the introduction of a standard leak into the test enclosure without requiring the selective pressurization of the leak standard with the attendant response problems.

In accordance with the invention, the leak standard is continuously providing tracer gas at its output and the leak is selectively connected to the test enclosure or exhausted to a point external of the system by selectively controlling the direction of flow of the pure air sweeping across the output of the leak standard. Thus, extremely fast and accurate switching of the leak standard is obtainable.

In accordance with the invention, the leakage attributable to the use within the test enclosure of quick release connectors is eliminated by providing a housing which substantially encompasses the connectors to provide a chamber which is open to the interior of the test enclosure while at the same time being connected to a pumping source through a line concentrically arranged with respect to the line for pressurizing the test unit. Thus, in accordance with the invention, any leakage around the test connector or through the pressurizing line is carried out of the housing which encloses the connector by the purified air being exhausted from the test enclosure between the concentric lines.

In accordance with the invention, an extremely effective manner for sealing the mating surfaces of the two portions of the test enclosure is obtained by utilizing metallic seals, thus obviating the problem associated with the seals absorbing tracer gas which thereafter may be released into the test enclosure. Furthermore, it has been found that the use of planar metallic surfaces not only eliminates the leakage problem, but, in addition, results in a more serviceable and trouble free seal than was previously the case with resilient materials. It has been found that minor nicks and scratches in the surfaces of the seals do not give rise to any leakage problems since it is merely necessary to correspondingly increase the rate of flow of purified air into the test enclosure to make up for any additional leakage attributable to such areas of wear.

While the specification concludes with claims, particularly pointing out and distinctly claiming, the subject matter which I regard as my invention, it is believed that the invention will be better understood from the following description taken in connection with the accompanying drawing in which:

Figure 1:
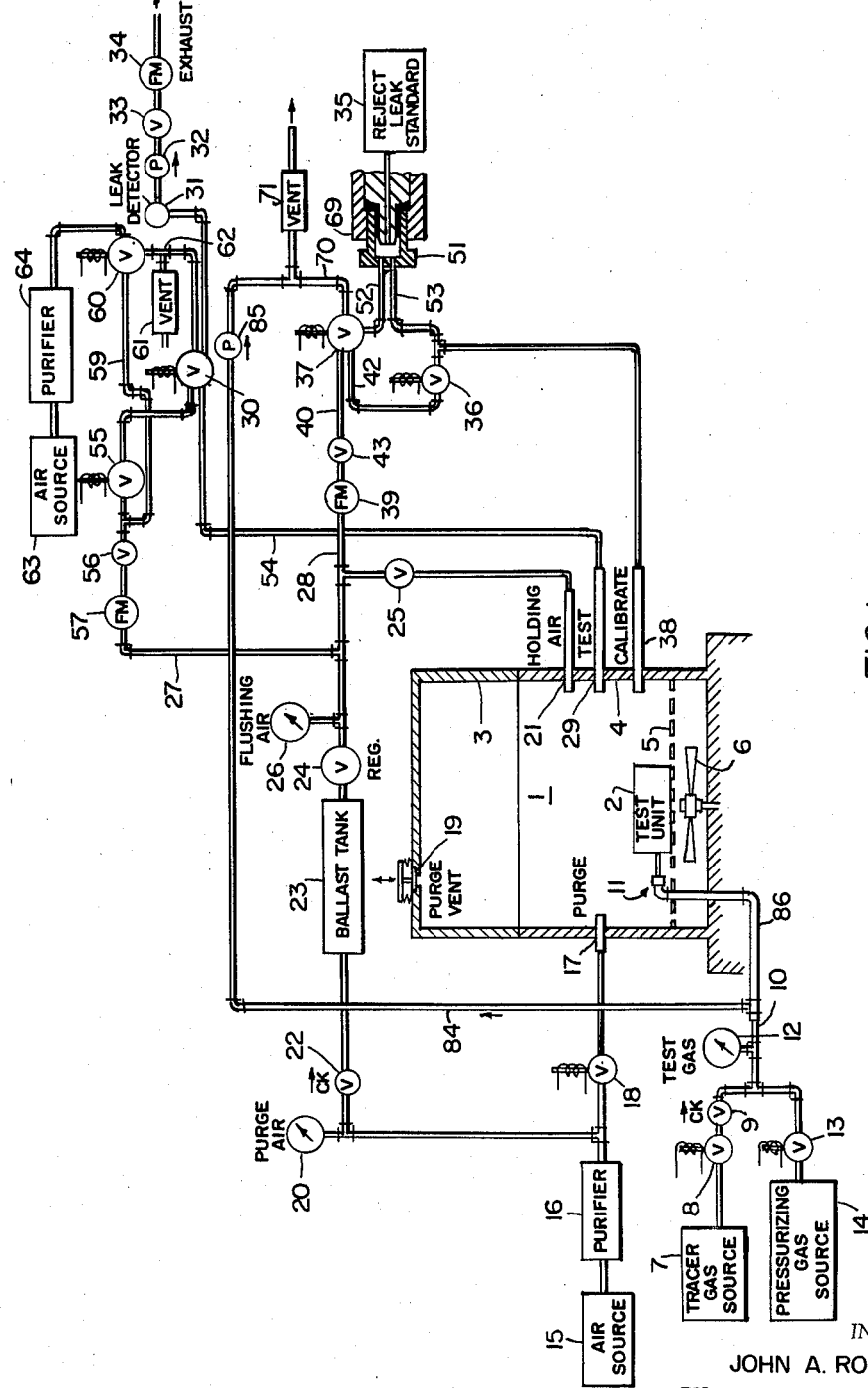
FIG. 1 is a schematic representation in block diagram form of a test unit under test at the leak test station in accordance with the invention.

Referring to FIG. 1, the leak test station of the invention is illustrated as comprising test enclosure 1, illustrated in its operative position in which the test unit 2 is supported in the environment provided by the test enclosure and associated control equipment. Test enclosure 1 is comprised of a removable upper portion or hood 3 which mates with the cup-shaped lower portion 4. Perforated member 5, which is supported above the base of test enclosure 1, provides means for supporting test unit 2 so that all sides thereof are readily accessible to the air circulating in the test enclosure. Fan 6, which is positioned in the center of cup-shaped portion 4 underneath perforated member 5, provides means for vigorously agitating the air within the test enclosure so as to uniformly mix any tracer gas leaking from test unit 2 with a purified air within the test enclosure.

In accordance with the invention, test unit 2 is pressurized by first placing a known quantity of tracer gas from source 7 in test unit 2. This may be accomplished by operating solenoid operated valve 8 to its open position so as to selectively connect source 7 to test unit 2 through check valve 9, line 10, and test unit connector 11 until the pressure indicated by Test Gas gauge 12 reaches the desired pressure. This may be accomplished in a well known manner by energizing solenoid 8 through a pressure responsive switch. When solenoid valve 8 is de-energized, solenoid valve 13 is operated to its open condition to pressurize test unit 2 by connecting high pressure source 14 (for example, 200 p.s.i.g.) to line 10. Check valve 9 provides means for preventing the application of a large back pressure to valve 8 and thus protects tracer gas source 7 from the high pressure of source 14.

Purified air is supplied to test enclosure 1 by purifying air emanating from source 15 in purifier 16 and then selectively connecting the purified air at its output to purge inlet 17 by operating valve 18 to its open position. The purified air selectively supplied to purge inlet 17 by solenoid valve 18 provides means for selectively purging the test enclosure by connecting the high pressure outlet of purifier 16 to the interior of test enclosure 1. During the purging of test enclosure 1, spring-biased purge vent 19 is operated to its open position to allow any contaminating gases to be driven from the test enclosure. Valve 18 should be energized for a sufficient length of time to assure that all gaseous contaminants are driven from the test enclosure. Purge Air gage 20 provides means for indicating the pressure at the output of purifier 16 and thus it indicates the pressure available for purging test enclosure 1.

The output of purifier 16 is also applied to Holding Air inlet 21 through check valve 22, ballast tank 23, pressure regulator 24 and manual valve 25. The purified air provided at the output of pressure regulator 24 is reduced in pressure to an intermediate value (for example, 10–20 p.s.i.g.) to provide a source of flushing air, the pressure of which is indicated by Flushing Air gauge 26. This air, in addition to being supplied to Holding Air inlet 21, is also supplied to lines 27 and 28 to continuously flush unused lines so as to prevent accumulations of tracer gas therein.

Ballast tank 23 provides means for supplying flushing air during the time that air is being purged from test enclosure 1 upon operation of solenoid valve 18. Check valve 22 prevents the loss of pressure in ballast tank 23 during the purging of the test enclosure.

In accordance with the invention, manual valve 25 may be adjusted to control the flow of purified air through Holding Air inlet 21 to provide a flow of purified air sufficient to assure that no in-leakage will take place between the mating surfaces of hood 3 and the cup-shaped lower portion 4 of the test enclosure.

Test inlet 29 and valve 30 comprises means for selectively connecting leak detector 31 to test enclosure 1 in order to measure the leakage from test unit 2. Pump 32, flow valve 33, and flow-meter 34, which are connected in series to the output of leak detector 31, comprise means for regulating the magnitude of the flow through leak detector 31 under all of its operating conditions.

To function as an automatic leak test station, means must be incorporated to reject units under test which have leaks in excess of the desired limit. Leak Detector 31 may thus comprise a reject relay, as is well known in the art, for automatically signalling the presence of a test unit having a leak rate greater than the desired leak rate. In order to adjust the operating point of the reject relay of detector 31, Reject Leak Standard 35 and its associated control valves 36 and 37 are provided for introducing into test enclosure 1 through Calibrate inlet 38 a leak having a rate equal to the desired reject leak rate. Leak standard 35 is variable throughout the range of desired reject limits so as to provide leaks of known size. Upon setting leak standard 35 to a desired leak rate, the leak provided at the output 69 of the leak standard may be coupled to Calibrate inlet 38 for a desired length of time in a manner hereinafter explained.

Figure 2:
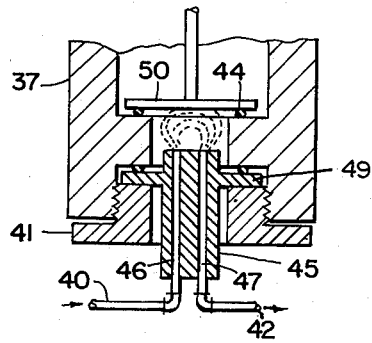
FIG. 2 illustrates a device utilized in the test station of FIG. 1 for coupling purified air to a normally closed valve seat to prevent accumulations of tracer gas at this valve seat.

Referring now to FIG. 2, a portion of valve 37 is illustrated in order to show its manner of cooperation with coupling device 41 when in its illustrated normal unoperated position. In this position, coupling device 41 provides means for sweeping valve 50 and seat 44 with the purified air flowing in lines 40 and 42. Coupling device 41 is illustrated as comprising a cylindrical body portion 45 having apertures 46 and 47 through its longitudinal dimension. The portion of cylindrical member 45, which extends beyond collar 49, places the upper ends of apertures 46 and 47 in proximity to valve seat 44 so that pure air entering line 40 will completely sweep the face of valve 50 before it flows downwardly through aperture 47 and enters line 42. Valve 36 is a conventional two-way solenoid valve which is normally in its open position to thus connect the purified air in flushing line 42 to Calibrate inlet 38.

Figure 4:
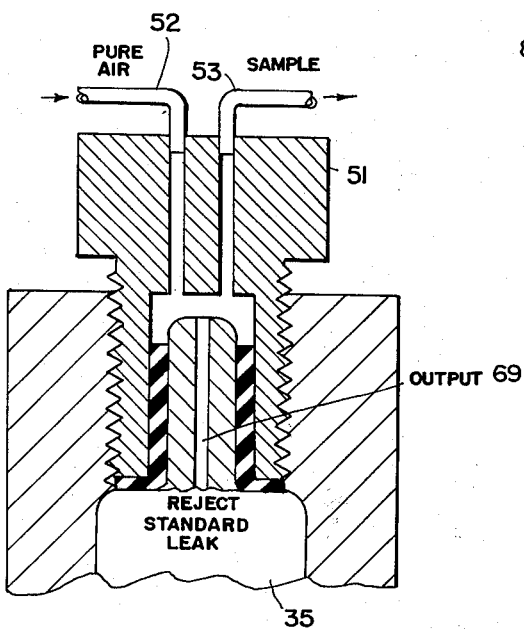
FIG. 4 is a device utilized in the test station of FIG. 1 for coupling the source of purified air to the leak standard.

Referring now to FIG. 4, there is illustrated leak standard coupling device 51 which provides means for introducing the leak emanating from output 69 of standard 35 directly into the air stream passing through lines 52 and 53. Assuming now that leak standard 35 is set to the desired reject limit, and assuming further that valves 36 and 37 are in their normal unoperated positions, the purified air flowing from line 28 through valve 36 not only flows into test enclosure 1 through Calibrate inlet 38 but also flows through line 53, coupling device 51, line 52, the normally open portion of valve 37 to line 70 and vent 71. Thus, in the normal unoperated conditions of valves 36 and 37, purified air passing through line 28 flushes the connection to Calibrate inlet 38, and in addition, carries the leak presented at the output of leak standard 35 and exhausts it to the atmosphere through vent 71.

Upon the operation of valves 36 and 37, the flow of purified air through valve 36 is interrupted while the direction of flow of purified air in coupling device 51 is reversed since purified air now passes from line 40 to line 52 through valve 37. This purified air is thus mixed with the known leak emanating from leak standard 35 in coupling device 51 and caused to pass through line 53 to Calibrate inlet 38. Thus, by timing the length of time that valves 36 and 37 remain operated, a known quantity of tracer gas may be introduced into test enclosure 1 for the purpose of setting the reject limit of leak detector 31. Therefore, if the leakage from a test unit is allowed to accumulate for the same length of time as valves 36 and 37 are operated during the calibration, the reject relay of leak detector 31 will operate to indicate a reject condition whenever a test unit has a leak equal to or greater than the leak of standard 35.

Means is also provided by normally open solenoid-operated valve 55, manual valve 56 and flowmeter 57 to supply purified line flushing air to line 54 and test inlet 29 so as to sweep this line and inlet clear of tracer gas during the time that they are unused. Solenoid valve 30 is identical in construction to valve 37, which was previously described with reference to FIG. 2. Thus, the flow of air in line 27 which may be adjusted by valve 56 for the desired indication on flowmeter 57 passes through normally open valve 55, the coupling device associated with valve 30 to flush line 54 and Test inlet 29. The coupling device may be identical with coupling device 41 illustrated in FIG. 2.

The purified air present at the output of valve 56 also passes through line 59 and a normally open portion of valve 60 to line 62 and vent 61. This provides an atmospheric source of purified air on the input of leak detector 31 when valve 30 is in its normal unenergized condition. The location of pump 32 on the output side of leak detector 31, while the input side is connected to a source of atmospheric source of purified air, protects the leak detector from the application of higher pressures such as the pressure of the flushing air in line 27. The intermediate pressure of air in line 27 is reduced through the operation of flow control valve 56. Valves 25 and 43 likewise serve to reduce the pressure of the purified air as well as control its flow in their corresponding lines. The flow in line 40 will be indicated by flowmeter 39.

In accordance with another feature of this invention, the location of the suction pump 32 and flow control elements 33 and 34 on the output side of leak detector 31 provides identical flow conditions through leak detector 31 whether it be sampling a specimen from test enclosure 1 or is merely passing purified air when valve 30 remains in its unoperated condition. This configuration is essential for adequate accuracy since leak detector 31 is extremely sensitive to variations in flow of gas through its detector element when operating with leaks of the order of $1 \times 10^{-9}$ ccs./sec. Thus, since leak detector 31 will be zero set with reference to the purified air present at the output of valve 60, the flow through leak detector 31 should be the same during the sampling of test enclosure 1 as when zero setting was taking place. Sampling of the test enclosure is accomplished by energizing valves 55 and 30. The operating of valve 55 interrupts the normal line flushing flow being carried to Test inlet 29 via the normally closed valve seat of valve 30 in a manner similar to that which was hereinbefore explained with reference to the valves 36 and 37. While the operation of valve 30 connects line 54 to the input of detector 31 to permit pump 32 to draw a sample from Test inlet 29.

Figure 3:
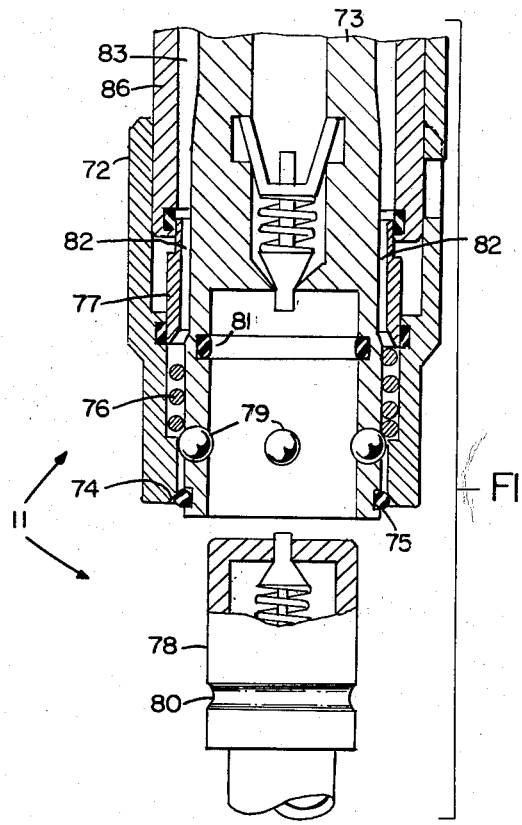
FIG. 3 illustrates a connector and associated housing utilized in the test station of FIG. 1 for establishing leak-free connections to the test unit.

Referring now to FIG. 3, the details of test unit connector 11 are illustrated as comprising a collar 72 which is concentrically arranged with respect to female connector 73. Collar 72 is maintained in the illustrated position in which ramp portion 74 is in sealing contact with O-ring 75 by operation of spring 76 bearing against shoulder 77 of female connector 73.

Male connector 78 may be joined to connector 73 by advancing collar 72 against spring 76 until balls 79 clear ramp portion 74 thus permitting connector 78 to advance into a position in which balls 79 fall into detent 80 and the valves are opened. Any leakage which tends to escape past O-ring 81 will escape around balls 79 to the region occupied by spring 76. This region is coupled via apertures 82 in shoulder 77 to space 83 which is formed between connector 73 and concentric line 86. Line 10, which is connected to connector 73, is also concentrically enclosed by line 86 from this connection point along its length until it reaches a point outside test enclosure 1. The space between concentric lines 10 and 86 which is coupled to space 83 is in turn in communication with line 84 and pump 85 which will draw any tracer gas from within collar 72 and exhaust it through vent 71.

Air source 63 in cooperation with purifiers 64 provides a standard source of purified air against which the output of purifier 16 may be checked. Means is provided by solenoid valve 60 for selectively disconnecting line 62 from line 59 and connecting it to the output of purifier 64. The purity of the air at the output of normally used purifier 16 may be checked by noting the reading of leak detector 31 when valve 60 is in its normal position and comparing it against the reading when it is connected to the output of purifier 64 which is utilized for test purposes only.

The length of time from the start of pressurization of test unit 2 upon operation of valve 13 until valves 30 and 55 operate to sample the halogen concentration of the test enclosure should be equal to the length of time that valves 36 and 37 are operated. In this way, the length of time that the unknown leak is allowed to accumulate will be equal to the length of time that the known leak is allowed to accumulate during the calibration of leak detector 31. Therefore, the relay of leak detector 31 will operate when the unknown leak exceeds the desired leak rate.

If it is desired to ascertain the unknown leak rate of a test unit from the leak rate indication of detector 31, the following formula may be used:

$$L_x = \frac{L_I V}{TF}$$

where:

$L_x$ = Unknown leak rate, std. cc./sec.
$L_I$ = Indicated leak rate, std. cc./sec.
  (when enclosure is sampled after accumulation)
$V$ = Enclosure volume, cu. ft.
$T$ = Accumulation time, hours
$F$ = Air flow through detector, std. cu. ft. 1 hr.

It may be seen from this formula that either increasing the accumulation time or increasing the sensitivity of detector 31 (i.e., increase $L_I$) will permit the measurement of smaller leaks, while the enclosure volume and detector air flow remain constant. Thus, when dealing with with extremely small leaks on the most sensitive detector range, sensitivity of the test station may be further increased by increasing the accumulation time.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. Apparatus for selectively connecting a tracer-gas leak standard to a test enclosure which contains a unit under leakage test while maintaining the connecting lines free of accumulations of tracer gas comprising a source of purified air, a calibrated leak standard containing said tracer gas, an inlet to said test enclosure for admitting gas thereto, a first line having a first valve operable to a first condition for selectively connecting said source of purified air to said inlet, a vent, a second line having a second valve operable to a first condition for selectively connecting said vent to the output side of said first valve, and means for coupling the output of said leak standard to a point on said second line which is interposed between said second valve and said output side of said first valve, said first valve being operable to a second condition for disconnecting said source of purified air from said inlet, said second valve being operable to a second condition for selectively disconnecting said second line from said vent and connecting it to said source of purified air whereby the output of said leak standard is carried by said purified air flowing in said second line to said inlet when both of said valves are in their second condition.

2. Apparatus for selectively connecting a tracer-gas leak standard to a test enclosure which contains a unit under leakage test while maintaining the connecting lines free of accumulations of tracer gas comprising a source of purified air, a calibrated leak standard containing said tracer gas, an inlet to said test enclosure for admitting gas thereto, a first line having a first valve operable to a first condition for selectively connecting said source of purified air to said inlet, a vent, a second line having a second valve operable to a first condition for selectively connecting said vent to the first line on the output side of said first valve, means for coupling the output of said leak standard to a point on said second line which is interposed between said second valve and said output side of said first valve, said first valve being operable to a second condition for disconnecting said source of purified air from said inlet, said second valve having a valve seat and means for coupling said valve seat directly to the purified air traversing said first line intermediate said source of purified air and said first valve, said second valve being operable to a second condition for selectively connecting said second line to said valve seat while disconnecting said second line from said vent.

3. The combination of claim 2 in which said leak standard coupling means comprises means inserted in series with said second line for causing the purified air traversing said second line to sweep across the output of said leak standard to thus carry the leaking tracer gas to said inlet or to said vent depending upon the operative condition of said first and second valves.

4. The combination of claim 3 further comprising means interposed between said source of purified air and said first line for controlling the flow rate of purified air entering said first line.

5. The combination of claim 4 in which said test enclosure comprises a base and a hood, each having surfaces which mate with the corresponding surfaces of the other to provide a substantially air-tight enclosure, said combination further comprising a second inlet, and means for introducing purified air from said source into said second inlet to prevent the entry of gases into said test enclosure by leakage between said mating surfaces.

6. The combination of claim 4 further comprising means inserted in series between said source of purified air and said second inlet for controlling the flow rate of purified air into said second inlet, said mating surfaces being metallic to thus provide a metal-to-metal seal between said hood and said base, valve means for controlling the flow rate of purified air into said second inlet so that it can be adjusted to a valve to prevent entry of gas through said metal-to-metal seal.

7. Apparatus for selectively connecting a tracer-gas detector to a test enclosure which contains a unit under leakage test while maintaining the connecting lines free of accumulations of tracer gas comprising a first source of purified air, an inlet to said test enclosure for extracting samples therefrom, a first line having a first valve operable to a first condition for selectively connecting said source of purified air to said inlet, means for detecting said tracer gas, a second line having a second valve operable to a first condition for selectively connecting said source of purified air to said detector, said second valve having a valve seat, means for coupling said valve seat directly to the purified air traversing said first line intermediate said first valve and said inlet, said first valve being operable to a second condition for disconnecting said source of purified air from said inlet, said second valve being operable to a second condition for selectively disconnecting said detecting means from said source of purified air and connecting it to said valve seat whereby said detector is placed in communication with said inlet of said container when said first and second valves are both in their second condition.

8. The combination of claim 7 in which said unit under test is supported in spaced-apart relationship with respect to the walls of said test enclosure, and means located in said box for agitating the air therein so as to uniformly mix any tracer gas leaking from the said test unit with the remaining air in said test enclosure.

9. The combination of claim 8 further comprising a vent to the atmosphere coupled to said second line at a point intermediate said second valve and said purified air source, and pumping means being connected in series with said detecting means on the opposite side of said second valve from said vent, said pumping means being connected in the direction necessary to extract a sample from said container through said inlet when said second valve is in said second condition.

10. The combination of claim 9 further comprising first means inserted in series with said pumping means for controlling the gaseous flow rate through said detecting means so as to permit control of said flow rate when said second valve is in either said first or second condition, the stability of the output of said detecting means being affected by the rate of flow of gas therethrough.

11. The combination of claim 10 further comprising second means interposed between said source of purified air and its connection to said first and second lines for controlling the flow of purified air available to said first and second lines.

12. The combination of claim 11 further comprising a second source of purified air to be used as a standard, a third valve, said third valve being in series with said second line between said vent and said second flow controlling means, said third valve connecting said first source of purified air to said second line when in its first condition and said second standard source of purified air to said second line when said third valve is in its second condition to thereby permit the checking of the purity of said first source against said standard source.

13. Apparatus for establishing connections within a test enclosure to a test unit under leakage test in order to introduce a tracer gas therein comprising a test enclosure having a base and a hood each of which has surfaces which mate with the corresponding surfaces of the other to provide a substantially air-tight enclosure, a source of purified air, an inlet to said test enclosure, means for introducing purified air from said source into said inlet to prevent the entry of gases into said test enclosure by leakage, means for connecting said unit under test to a tracer-gas source external to said test enclosure, said connecting means being detachable from said unit at a point within said test enclosure, pumping means, means connected to said pumping means and substantially enclosing said connecting means at said point of connection to said unit for flushing any tracer-gas leakage at said point from the interior of said test enclosure, said flushing means having an opening therein which is positioned with respect to said point such that any leakage at said point is swept into said flushing means along with the flow of purified air in said flushing means.

14. The combination of claim 13 in which said test unit has a coupling device for establishing connections thereto and said connecting means comprises a line terminating in a coupling device that mates with the coupling device of said test unit to provide a substantially leak-free connection to said test unit, said flushing means comprising means concentrically arranged about said line and its terminating coupling and extending from said coupling to a point external of said test enclosure, said pumping means being in communication with the spaces between said line and said concentric flushing means for drawing gas out of said space so that any leakage gas present will be drawn out and replaced by pure air being added through said inlet.

15. The combination of claim 14 in which the output of said source of purified air is at a relatively high pressure, said means for introducing purified air from said source into said inlet comprises pressure regulating means for reducing the pressure of said purified air to an intermediate pressure, said inlet having valve means for controlling the flow rate of purified air into said inlet so that it can be adjusted to a valve sufficient to prevent entry of gas between said mating surfaces, said test enclosure having a second inlet, said combination further comprising means for selectively connecting the high pressure output of said source of purified air to said second inlet to selectively purge said container to rapidly remove any possible tracer gas therein.

References Cited by the Examiner
UNITED STATES PATENTS
3,027,753   4/62   Harder _____ 73—49.3

ISAAC LISANN, *Primary Examiner.*